United States Patent [19]

Sofia

[11] 4,376,610

[45] Mar. 15, 1983

[54] STORAGE AND HANDLING SYSTEM FOR PHOTOGRAPHIC SLIDES AND THE LIKE AND METHOD

[76] Inventor: John W. Sofia, 138 Lancaster Ter., Brookline, Mass. 02146

[21] Appl. No.: 166,062

[22] Filed: Jul. 7, 1980

[51] Int. Cl.³ .......................................... B65G 61/00
[52] U.S. Cl. .................................. 414/416; 206/456;
  206/814; 294/87 R; 294/99 R; 414/786
[58] Field of Search ............ 414/416, 786; 294/87 R, 294/99 R; 24/255 R, 259 R; 353/103, 113; 206/455, 456, 814

[56] References Cited

U.S. PATENT DOCUMENTS 2,814,965 12/1957 Lacoe .
3,038,270 6/1962 Nagel .............................. 353/113 X
3,244,273 4/1966 Wiklund ............................. 206/456
3,400,843 9/1968 Johnson ............................. 414/416
3,711,905 1/1973 Eckerdt et al. ............... 294/87 R X
3,926,514 12/1975 Costanza et al. .

Primary Examiner—Robert G. Sheridan
Attorney, Agent, or Firm—Hamilton, Brook, Smith & Reynolds

[57] ABSTRACT

A method and apparatus for storage and removal and handling of photo transparencies is described comprising a spacer for partitioning a predetermined number of transparency slides and tongs which are inserted into the spacer for clamping the predetermined number of slides for removal thereof. The tongs are operated by compressing the tabs on the tongs which spread the tongs' arms apart causing previously clamped slides to be released. When the tabs on the tongs are not compressed, the arms are sufficiently wide to contain the predetermined number of slides partitioned by the spacer.

8 Claims, 9 Drawing Figures

STORAGE AND HANDLING SYSTEM FOR PHOTOGRAPHIC SLIDES AND THE LIKE AND METHOD

DESCRIPTION

TECHNICAL FIELD

This invention is in the field of storage and handling of photographic slides or the like.

BACKGROUND ART

A need exists for a system of handling phototransparency slides which does not require bulky and expensive storage trays and allows "stack-loading" without requiring a projectionist to handle individual slides.

The currently available techniques for slide storage and handling all involve dedicated storage magazines. Two generic categories can be defined:

(a) Individual slide magazines—These devices are typified by the familiar carousel-magazine design; in which each slide is individually stored in an isolated compartment within the carousel. The carousel attaches to the projector mechanism and serves as a dedicated storage and transfer magazine. Of the two categories, this technique represents the lowest slide storage density, the most expensive system and is characterized by intermediate subject continuity.

(b) Stack magazines—In this case, individual, dedicated magazines store slide stacks, usually consisting of about 40 slides as required by most current stack-loading projection machines. One example of the stack magazine system is shown in U.S. Pat. No. 3,926,514, entitled "Slide Projector Loading—Unloading Station," Costanza, et al. The system shown in the referenced patent is marketed as the Bell & Howell "Slide Cube System". In this system, cubical magazines, each containing one stack, are individually attachable to a specific Bell & Howell projector and serve as dedicated storage and transfer compartments. Another example of the stack magazine category is a Kodak product called "Slide Clips". This device is similar to the "Slide Cube" system but operates only with Kodak stack-loading projectors. Comparatively, this category represents intermediate storage density, intermediate expense and the poorest subject continuity and organization.

DISCLOSURE OF THE INVENTION

This invention relates to a magazineless slide storage and handling system for phototransparency slides. The system consists of a mass storage tray with a slide restraining clip and two devices adapted to enable easy transferral of stacks of slides between the storage tray and a stack-loading projector. These two devices consist of a slide spacer, used to partition a set number of slides (about 40), and a pair of slide tongs, used to grip the slide stack, thus forming a clamped module for transfer between the storage tray and a stack-loading projector.

The slide storage tray consists of a box with full-length, parallel partitions which form channels in which continuous stacks of slides are stored in the vertical plane, i.e., standing on edge. The height of the box is equal to the height of a slide standing on edge; the length of the channels is designed to accomodate an integral number of slide stacks. The storage tray also employs a restraining clip which is used to restrain slides in channels which are not completely full. Under expected operating conditions, only one channel would need a restrainer since slides are stacked continuously from one channel to the next. Customarily, a new channel would start to be filled only after the previous channel is full.

The tongs consist of first and second planar arms and a compressible planar member. The compressible planar member is preferably made of spring-like material, such as hardened stainless steel shim stock. This member is joined to each of the two arms forming an "H" configuration, in which the compressible member is the cross piece. Manually squeezing across one pair of the arm ends i.e., at the top of the "H", will elastically bend the spring-band and thereby spread the other pair of arm ends (at the bottom of the "H"). It will thus be seen that the arm ends on the top of the "H" provide a pair of tabs which present a good purchase area when it is desired to compress the tongs. This device, so operated, acts as a spring-loaded tong, which is dimensioned to clasp a slide-stack in compression when hand pressure is released.

The tongs are used in conjunction with a spacer. The spacer consists of first and second semi-rigid planar members which are maintained in a horizontally spaced apart relationship by a spacer which may consist of a pair of rods extending between the two planar members. The spacer is inserted into the slide tray of slides to partition an appropriate number of slides within the spacer. The tongs are then squeezed to spread the lower or bottom arms against the opposing surfaces of the first and second planar members of the spacer and the tongs' arms are then inserted a sufficient depth within the spacer. When the squeezing force is released, the partitioned slide stack will be compressed and grasped as a unit between the opposing arms of the tongs. The slides may then be removed from the tray leaving the spacer to prevent the remaining slides in the tray from collapsing into the void left by the removed slides. The removed slides, now held between the arms of the tongs, may be manually transported to a stack-loader, and released, by again squeezing the tongs, into the input hopper of the stack-loader. When viewing of the stack is complete, the slides are clasped again by the tongs and returned to the space in the slide storage tray maintained by the spacer.

The above-described invention provides a highly compact storage system for photo slides which is convenient, easy to use and does not require a dedicated magazine for each set of slides to be projected. The system eliminates the need for more bulky, expensive storage trays and allows horizontal "stack-loading" without requiring a projectionist to handle slides directly. Thus, slides can be handled in relatively small stacks yet stored in much larger stacks without magazines. Higher storage density is thereby achieved at substantially less expense than with other systems currently available.

The invention will now be described in greater detail in connection with the drawings.

BEST MODE OF CARRYING OUT THE INVENTION

Figure 1:
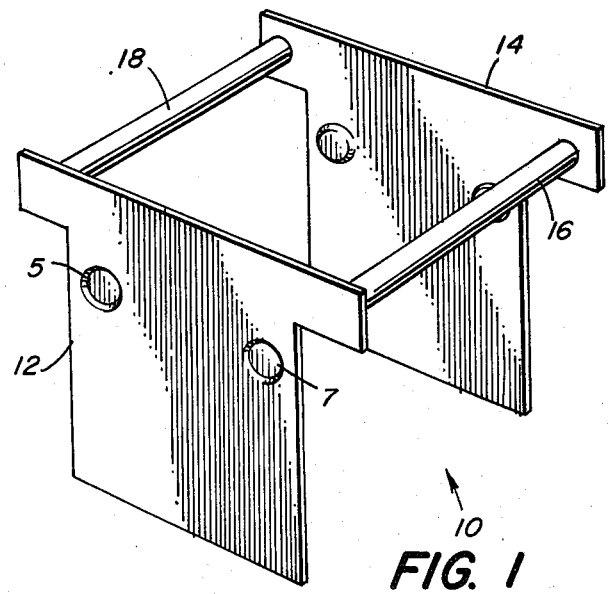
FIG. 1 is a perspective view of a spacer means of the invention.

A spacer 10 for use in connection with the invention is shown in FIG. 1. As may be seen in FIG. 1, spacer 10 consists of a pair of semi-rigid "T" shaped planar members 12 and 14 which may be fabricated from stainless steel or plastic. Rod-like spacer members 16 and 18 are fastened by suitable processes, such as machine screws, to the uppermost sections of the planar members 12 and 14. Thus, rods 16 and 18 serve to space the planar surfaces of the spacer an appropriate distance apart which distance is preferably established to accomodate 40 slides in a loose relationship. In a preferred embodiment, the distance between members 14 and 12 is approximately 2 inches which will partition between 38 and 42 slides. For standard size slide transparencies, spacer 10 is approximately 2 inches wide at its bottom dimension and an additional $\frac{3}{8}$ inches wide at each side at its topmost dimension. The height of spacer 10 is 1 and $\frac{3}{8}$ inches up to the start of the projection of the crossbar of the "T" and an additional $\frac{3}{8}$ inch to the top of the planar member.

Figure 2:
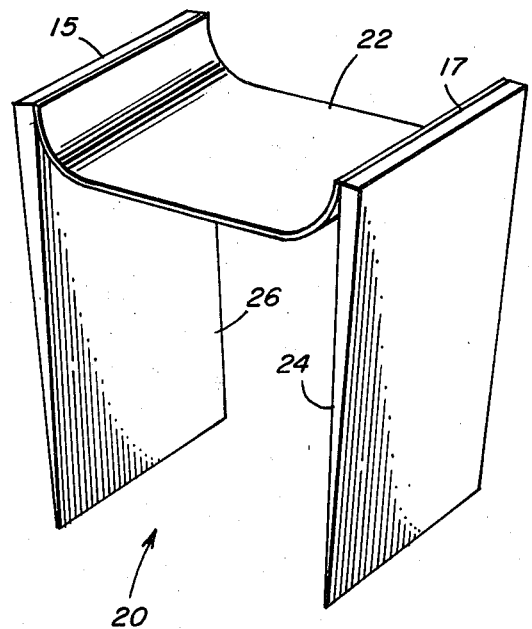
FIG. 2 is a perspective view of a tongs means of the invention.

Referring now to FIG. 2, the tongs to be used in this invention will be described. Tongs, 20, comprises a first planar arm, 26. In the embodiment illustrated, arm 26 has a tapered cross-section as shown, however, it is understood that this tapering has little or no bearing on the performance of the device and that such tapering may be omitted without substantial functional effect. A second similar arm, 24, is disposed opposite arm 26. A bendable, elastic member, 22, which may be formed from springy metallic sheet metal or may consist of a suitably compressible plastic, is disposed between the two arms and joined to the top or wider ends thereof, thereby forming unitary generally "H" shaped tongs with tab portions 15 and 17 at the top end of the "H". Cross-member 22 has a generally planar surface except where it joins the top ends of arms 26 and 24 where (as previously noted) it is bent upwardly to form a pair of tabs at each top end of the tongs and a semi-rigid cross piece which is readily compressible by exerting an inwardly directed force at the tabs, as shown (for example) in FIG. 4c. In practice, the entire tong may be formed from one piece of stainless steel shim stock, approximately bent and formed by well known methods, or molded in plastic to the desired shape. Member 22, in its uncompressed state, maintains the narrower or lower ends of arms 26 and 24 disposed apart a sufficient distance to hold the stack of slides spaced by spacer 10. The interrelationship of spacer 10 and tongs 20 will be described in detail in connection with FIG. 4.

Figure 3:
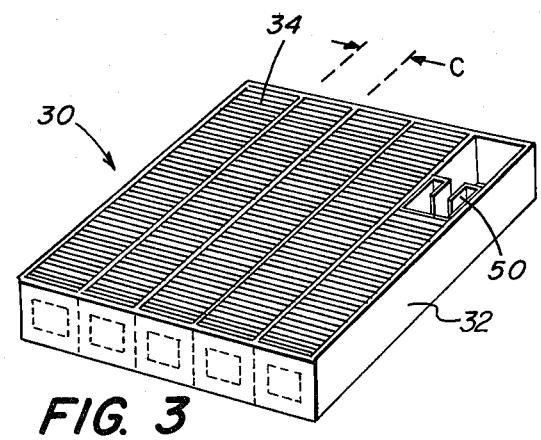
FIG. 3 is a schematic representation of a storage tray for the invention.

However, for the moment, we shall refer to FIG. 3 which illustrates a suitable slide storage tray which can accommodate a suitable number of slides in the correct horizontal position for use in the apparatus of this invention. Storage tray 30 may consist of a plastic container 32, as shown, which is partitioned into a suitable number of rows such as the five rows shown in FIG. 3, it being understood, however, that six or any number of rows may be used in the storage tray.

The slide storage tray of typical, convenient dimensions will have 6 channels, each channel being 8 inches in length. A tray will thus hold 4 stacks of 40 slides per channel. The tray depth should equal the height of the slides standing on edge.

Figure 5:
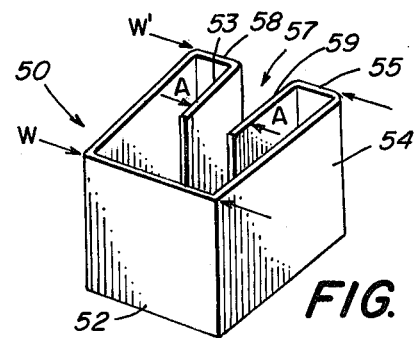
FIG. 5 is a perspective view of a restraining clip of the invention.

Lastly, a restraining clip 50, as shown in FIG. 5, is provided in order to restrain slides in a vertical position in those channels of the storage tray which are not filled with slides. Clip 50 consists of a generally U-shaped bent sheet metal member formed, for example, from stainless steel spring stock. The width W of surface 52 which forms the bottom of the "U" is made slightly less than the width "C" of the slide tray channels shown in FIG. 3. In the preferred embodiment W is 1 15/16 inches. The width W' is the width of the clip at the top of the "U"; consisting of the width of gap 57 and members 55 and 58. The width W is made slightly greater than the width "C" of the slide tray channels, i.e. $2\frac{1}{8}$".

Squeezing the clip 50 at surfaces 53 and 59 at the points shown by arrows A—A will reduce the outside dimension of W' and allow clip 50 to be inserted in the 2" wide channels of tray 30, as shown more clearly in FIG. 3. When finger pressure is released, the clip expands to fix itself along the length of the channel wherever the operator desires.

Referring now to FIG. 4, the method of operation of the storage handling system will be described in detail.

Figure 4A:
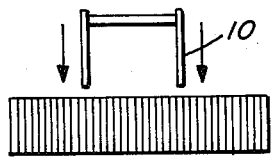
FIG. 4a–4e illustrates the method of operation of the invention in schematic form.
Figure 4B:
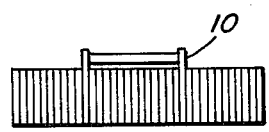
Figure 4C:
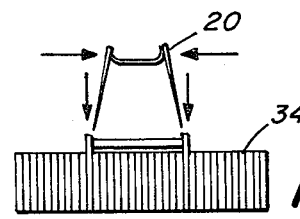
Figure 4D:
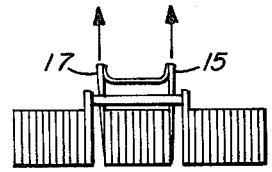
Figure 4E:
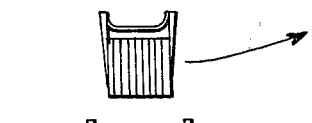

In a typical operation, the spacer 10 is inserted into a sector of the storage tray as shown in FIG. 4a automatically thereby partitioning the correct number of slides to fill a stack-loader. Typically, this would amount to about 40 slides. FIG. 4b shows the spacer 10 fully inserted in the storage tray. Next, the arms of the tongs 20 are spread with one hand by pressing on the upper tabs of the tongs as shown by the horizontal opposing arrows in FIG. 4c. The arms are spread sufficiently to contact the opposing surfaces of planar members 12 and 14 of the spacer 10. While so contacting the opposing surfaces 14 and 12 of the spacer means, the tongs are inserted into the spacer in the direction shown by the vertical arrows in FIG. 4c. Next, with the tongs fully inserted, hand pressure on the top tabs of tongs 20 is released and the slides are thereby clamped within the grasp of arms 24 and 26 of tongs 20. The tongs may then be withdrawn holding the correct number of slides in the stack as shown in FIG. 4d. Next, as represented in FIG. 4e, the tongs with the clamped slide stack may be inserted into a stack-loader and the stack released using hand pressure on the tabs. The tongs would then be withdrawn and the slide stack projected. After the entire stack is projected, the steps depicted in FIGS. 4a through 4e may be reversed. Note that while the slides in a stack are being shown, the spacer remains in a row of the tray in order to prevent the remaining slides from collapsing into the void created by the slide stack removal.

If desired, the spacer 10 of FIG. 1 may be improved by providing bumps or bosses or dimples 5 and 7 on the inside walls of planar members 12 and 14 which will serve to slightly bend the top portions of the slides away from the walls thus allowing relief for the tongs arms to be inserted between the walls and the slides.

Equivalents

Those skilled in the art may recognize other equivalents to the specific embodiments described herein, which equivalents are intended to be encompassed by the claims attached hereto. It is also noted that the invention should not be limited to use with slide transparencies only, but may be adapted for storage and handling of any type of horizontally stacked card-like members.

I claim:

1. A method of storage, removal and handling of photo-transparency slides stacked in a slide storage tray by utilizing a movable spacer and tongs comprising the steps of:
   a. inserting a self-supporting movable spacer having a pair of end walls held in fixed spaced apart relation to each other into a sector of a slide storage tray thereby to partition a predetermined number of slides between the end walls of said spacer said end walls being spaced apart a distance corresponding to the thickness of said predetermined number of slides;
   b. creating a compressive force on the tongs by manually squeezing across one pair of tongue arm ends to spread the arms of said tongs against the partitioning end walls of said spacer;
   c. inserting the spread arms of said tongs a sufficient depth within said spacer so that upon cessation of said compressional force, the predetermined number of slides will be held end-to-end between the opposing arms of said tongs.

2. The method of claim 1 including the step of removing said predetermined number of slides from said spacer while leaving said spacer in place to prevent the remaining slides from collapsing into the void left by the removed slides.

3. A slide transparency system for handling a predetermined number of slides comprising:
   a. a free-standing movable spacer for partitioning said predetermined number of slides, said spacer having a first semi-rigid planar member; a second semi-rigid planar member; and a pair of spacer means affixed between the topmost portion of said planar members for maintaining said first and second members in a horizontally spaced apart fixed relationship; and,
   b. tongs adapted to be inserted between said planar members, said tongs having:
      a first planar arm;
      a second planar arm, each of said first and second arms having a top and bottom end; and
      a unitary compressible member joined to each arm at the top ends thereof, said compressible member being compressed by manually squeezing across the top ends of said arms so as to maintain the other end of said arms disposed a predetermined distance apart sufficient to hold said predetermined number of slides end-to-end within the grasp of said arms when said member is not being compressed and to expand the distance between the ends of said arms when compressed.

4. A system for handling a predetermined number of vertically stacked rectangular card-like items stored in a storage tray comprising:
   a. a free-standing movable spacer for partitioning said predetermined number of items, said spacer having a first semi-rigid T-shaped planar member; a second semi-rigid T-shaped planar member; and a pair of spacer means extending between the horizontal bars so the T-shaped member for maintaining said first and second members in a horizontally spaced apart fixed relationship, the distance apart being the end-to-end width of the predetermined member of stacked items; and,
   b. a compressible tong adapted to be inserted between said spacer, said tong having:
      a first planar arm;
      a second planar arm;
      a compressible member joined to each arm at one end thereof so as to maintain the other ends of said arms disposed a predetermined distance apart sufficient to hold said predetermined number of items end-to-end within the grasp of said arms when said member is not being compressed and to expand the distance between the ends of said arms when compressed by manually squeezing said member across the joined ends of said arms.

5. The apparatus of claim 4 including a storage tray restraining clip for holding said items vertically in the channels of said tray.

6. The apparatus of claim 5 in which said restraining clip consists of a U-shaped spring member which is slideably engaged in said channel.

7. The apparatus of claim 4 in which said tongs are generally H-shaped in cross-section.

8. The apparatus of claim 3 in which inwardly directed dimples are provided on each semi-rigid planar member.

* * * * *